UNITED STATES PATENT OFFICE.

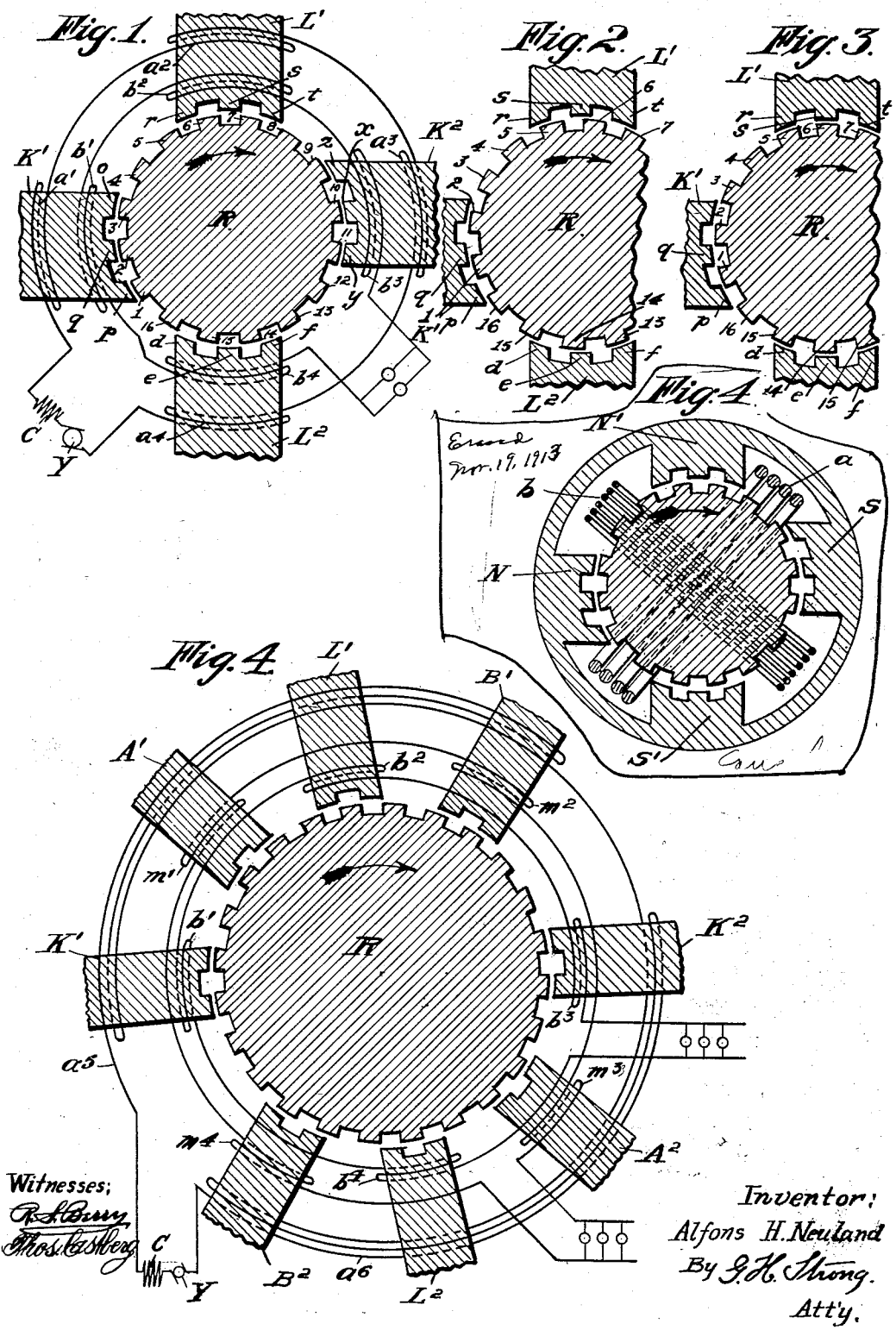

ALFONS H. NEULAND, OF SAN FRANCISCO, CALIFORNIA, ASSIGNOR TO NEULAND ELECTRICAL COMPANY, INC., A CORPORATION OF NEW YORK.

DYNAMO-ELECTRIC MACHINE.

1,160,087.      Specification of Letters Patent.      Patented Nov. 9, 1915.

Application filed January 25, 1912. Serial No. 673,281.

*To all whom it may concern:*

Be it known that I, ALFONS H. NEULAND, a subject of the Czar of Russia, residing in the city and county of San Francisco and State of California, have invented new and useful Improvements in Dynamo-Electric Machines, of which the following is a specification.

The invention relates to dynamo electric machines and particularly to alternating current dynamo electric machines.

The object of the invention is to provide a dynamo electric machine which possesses a very large power capacity in proportion to its size.

Another object of the invention is to provide a highly efficient machine containing no moving current carrying coils.

A further object of the invention is to provide a machine adapted to generate high frequency currents at relatively low speeds of revolution.

The invention possesses other advantageous features, which, with the foregoing, will be set forth at length in the following description, where I shall outline in full that form of the apparatus which I have selected for illustration in the drawings accompanying and forming part of the present specification.

The novelty of the invention will be included in the claims succeeding said description. From this it will be apparent that I do not limit myself to the showing made by said drawings and description, as I may adopt many variations within the scope of my invention as expressed in said claims.

Referring to said drawings: Figure 1 is a diagrammatic representation of a cross section of part of the apparatus of one form of my invention. Fig. 2 is a similar view showing the inductor in a different position. Fig. 3 is a similar view showing a further movement of the inductor. Fig. 4 is a similar view of a modified form of the machine.

The machine of my invention may be employed as a motor or generator, but for the purposes of description herein, I shall describe its operation as a generator. In Figs. 1, 2 and 3, I have shown a single phase machine, and in Fig. 4, a two phase machine, and I shall direct the principal description herein to the single phase type, from which the application of the invention to the generation of polyphase currents will be evident.

The present machine is highly efficient in operation, has a very large power capacity in proportion to its size, and is constructed without any moving current carrying windings. Machines having a somewhat similar appearance and known as inductor alternators have been constructed heretofore, but such machines have been generally of such low efficiency that their use is impractical. The present machine employs stationary magnetizing and induced windings so arranged that all of the magnetic flux produced must pass through the induced coils. It is a well known fact that by varying a magnetic flux through a coil, a current is generated in that coil and such condition is employed in the present machine. One of the characteristics of the present construction is the surrounding of a group of poles of like sign with a single magnetizing winding and a single induced winding, and simultaneously varying the magnetic resistance through each of said poles in the same degree. The resistance of the magnetic circuit is varied by the rotation of a part of the magnetic circuit. This rotatable element or inductor, by varying the resistance of the magnetic circuit through said poles, causes a variation in the magnetic flux therein, thereby inducing a current in the induced winding.

In the construction illustrated in Figs. 1, 2 and 3 the machine consists of a frame not shown, on which are arranged four inwardly projecting pole-pieces $L'$—$L^2$, $K'$—$K^2$ which are preferably formed integral with the frame. Arranged on the pole-pieces are the magnetizing windings $a'$—$a^2$—$a^3$—$a^4$, preferably connected in series and wound in such manner that two negative and two positive pole-pieces are obtained, and in the present embodiment pole-pieces $K'$—$L'$ are of one polarity and pole-pieces $K^2$—$L^2$ are of opposite polarity, that is, pole-pieces $K'$—$L'$ may be positive poles and $K^2$—$L^2$ negative poles. The magnetizing circuit is shown separately excited by a source of direct current Y having a choke coil C arranged in series therewith.

Arranged on the pole-pieces $K'$—$L'$—$K^2$—$L^2$, adjacent and in close relation to the magnetizing windings are the induced windings $b'$—$b^2$—$b^3$—$b^4$ which are connected in series with the power leads. The induced windings are wound in one direction on pole-pieces $L^2$ and $K'$ and in the opposite direction on pole-pieces $L'$ and $K^2$, that is, the magnetizing and induced windings run in the same direction with respect to each other on pole-pieces $L'$ and $L^2$ and in the opposite direction with respect to each other on pole-pieces $K'$ and $K^2$, and in the induced windings run in opposite directions with respect to each other on pole-pieces $K'$ and $K^2$ and on pole-pieces $L'$ and $L^2$.

The inner face of each pole-piece is provided with a plurality of regularly spaced teeth, the pitch of the teeth being substantially equal to twice the width of a tooth. In the present construction there are three teeth on each pole-piece, pole-piece $K'$ having three teeth $o$, $q$, $p$; pole-piece $L'$ having three teeth $t$, $s$, $r$; pole-piece $K^2$ having three teeth $y$, $x$, $z$, and pole-piece $L^2$ having three teeth $f$, $e$, $d$.

The inner faces of the teeth on all of the pole-pieces lie in a circular plane. Each tooth comprises a separate pole so that each pole-piece comprises a group of poles surrounded by a single magnetizing winding, and a single induced winding.

Arranged between the pole-pieces and concentric with the inner surfaces of the teeth thereon is a rotatable inductor R, having a plurality of regularly spaced teeth thereon, of substantially the same size and pitch as the teeth on the pole-pieces. The outer surfaces of the teeth on the inductor are arranged in a circle concentric with and in close relation to the inner faces of the teeth on the pole-pieces. In the construction shown in Figs. 1, 2 and 3 there are sixteen teeth on the inductor, the teeth being numbered from 1 to 16 inclusive. The pole-pieces are so arranged, or the number of teeth on the inductor is so fixed, that when several teeth on the inductor are alined or are in coincidence with the poles on one pole-piece, other teeth on the inductor are in coincidence with the poles on one of the pole-pieces of opposite sign. Fig. 3 shows teeth 5, 6, 7 on the inductor in coincidence with poles $n$, $s$, $t$ on pole-pieces $L'$ and teeth 13, 14, 15 in coincidence with poles $f$, $e$, $d$ on pole-piece $L^2$, therepy establishing a magnetic circuit of minimum resistance through pole-piece $L'$, the inductor R, pole-piece $L^2$ and the frame on which the pole-pieces are arranged.

It is desirable that the sum of the fluxes in all of the poles remains constant, and, therefore, the resistance of the magnetic circuit in the machine must be constant. In order to accomplish this, the area of the teeth on the inductor in juxtaposition or in coincidence with the teeth or poles on the pole-pieces, must be constant for all positions of the inductor. This is accomplished by spacing the pole-pieces so that the distance between the center of the leading pole, for instance, pole $r$ on pole-piece $L'$, on one pole-piece is spaced apart from the center of the last pole, for instance pole $o$ on pole-piece $K'$, on the preceding pole-piece, a distance equal to one-half the pitch of the teeth, or an odd multiple of one-half the tooth pitch, the pitch being the distance between the centers of two adjacent teeth on the inductor or on one pole-piece. The number of teeth on the inductor or on each pole-piece is immaterial as long as the above relations are maintained, but for a given speed of rotation of the inductor, the frequency of the alternating current depends entirely upon the number of teeth.

In the embodiment shown in Fig. 3, the teeth on the inductor are coincident with the poles on pole-pieces $L'$ and $L^2$ and are staggered with regard to the poles on pole-pieces $K'$—$K^2$, thereby causing substantially all of the flux to pass between the pole-pieces $L'$—$L^2$. In this position the resultant flux in the induced windings is a maximum. In Fig. 2, the inductor has moved a distance in the direction indicated by the arrow, equal to half the width of a tooth, bringing the teeth on the inductor into half coincidence with the poles on the pole-pieces, thereby dividing the flux between the four pole pieces, so that half of the flux passes from pole-piece $L'$ to $K^2$ and the other half from pole-piece $K'$ to $L^2$. In this position the resultant flux in the induced windings is zero. Another movement of the inductor a distance of one-half tooth brings the parts into the position shown in Fig. 1, in which substantially the entire flux passes from pole-piece $K'$ to pole-piece $K^2$, producing a maximum resultant flux in the induced windings in opposite direction from the flux when the parts are in the position shown in Fig. 3. When the resultant flux in the induced circuit is a maximum, the resultant E. M. F. is zero and when the resultant flux is zero, the E. M. F. is a maximum. This variation of the flux through the induced winding is continuous as the inductor is rotated and an alternating current is produced. When the inductor is intermediate the positions shown, the flux is variously distributed between the four pole-pieces, causing an increase and decrease in the E. M. F., the E. M. F. being a maximum when the rate of shifting of the lines of force is at a maximum, or when the total effective value of the magnetic flux is zero. The flux is varied through parts of the magnetic circuit and is alternated through the induced windings, and on account of the relation of the magnetizing and induced windings, all of the flux produced must pass through the induced windings.

By surrounding a number of poles of like sign with a single induced winding, a considerable saving of copper is effected, and the losses in the machine, where the voltage per turn is great, owing to the high rate of change of the magnetic flux, are greatly reduced. The same is true of the exciting coils, in which a large saving of copper is effected and since for a given current density the exciting watts are in proportion to the exciting copper, a corresponding reduction in the exciting watts is obtained. The loss due to molecular friction in the iron caused by the reversal of magnetism in machines as heretofore constructed, and commonly known as the hysteresis loss, is greatly reduced, since the magnetic flux in the pole-pieces is not reversed. The loss of energy due to eddy currents in the laminated iron is also substantially reduced, since currents induced by a varying magnetic flux is small in comparison with those induced by an alternating magnetic flux.

In the construction shown in Fig. 4, I have illustrated the principle of my invention as applied to the generation or conversion into mechanical energy, of polyphase currents, the present instance employing a two-phase current. It is evident that the machines of my invention may be employed as motors or generators and may employ single or polyphase currents. In Fig. 4 I have shown eight pole-pieces K'—A'—L'—B'—K²—A²—L²—B² arranged in two groups with relation to the induced windings. The induced windings of one phase are arranged on pole-pieces K'—L'—K²—L² and the windings of the other phase are arranged on pole-pieces A'—B'—A²—B², the pole-pieces being arranged so that the induced E. M. F. will have a phase displacement of 90 degrees. Arranged on pole-pieces K'—L'—K²—L² are the induced windings $b'$—$b^2$—$b^3$—$b^4$ of one phase and arranged on pole-pieces A'—B'—A²—B² are the induced windings $m'$—$m^2$—$m^3$—$m^4$ of the other phase. The windings of each phase are shown connected in series with each other and with the power line. Each pole-piece is surrounded by a single induced winding. The exciting or magnetizing windings $a^5$—$a^6$ are arranged to cause the pole-pieces K'—A'—L'—B' to be magnetized in one direction, for instance north polarity, and the pole-pieces K²—A²—L²—B² to be magnetized in the opposite direction, or south polarity. Each pole-piece is provided with a plurality of teeth, producing on each pole-piece, a group of poles of like polarity surrounded by a single magnetizing and a single induced winding. The construction of the inductor R and the operation of the machine is substantially the same as set forth in regard to the single phase construction.

Various changes may be made in the arrangement of the magnetic and electric circuits in the machines of my invention and I do not limit myself to the exact construction set forth herein.

I claim—

1. In a dynamo electric machine, a plurality of pole-pieces, magnetizing windings surrounding said pole-pieces adapted to produce a plurality of pairs of pole-pieces of opposite polarity, a single induced winding surrounding each pole-piece, a plurality of teeth on each pole-piece spaced apart regularly, and a toothed rotating element arranged adjacent said teeth adapted to simultaneously and similarly vary the flux through the pole-pieces of each pair.

2. In a dynamo electric machine, a plurality of pole-pieces, magnetizing windings surrounding the pole-pieces adapted to produce an equal number of positive and negative pole-pieces, the pole-pieces being arranged so that each positive pole-piece lies substantially diametrically opposite a negative pole-piece, a single induced winding surrounding each pole-piece, a plurality of teeth on each pole-piece spaced apart regularly, a rotatable element arranged adjacent the toothed faces of the pole-pieces, and a plurality of teeth on the outer face of the rotating element spaced apart the same distance as the teeth on the pole-pieces.

3. In a dynamo electric machine, a stationary member, a plurality of pairs of pole-pieces on said member, a single magnetizing winding and a single induced winding surrounding each pole-piece, a plurality of teeth on the inner face of each of said pole-pieces, a rotatable member arranged adjacent the toothed pole-pieces, and a plurality of teeth on said rotatable member of the same size and pitch as the teeth on the pole-pieces, said pole-pieces being arranged so that when the teeth on one pair of pole-pieces coincide with the teeth on the rotatable element, the teeth on another pair of pole-pieces are staggered with relation to the teeth on the rotatable element.

4. A dynamo electric machine, comprising a stationary frame, a plurality of pole-pieces arranged on said frame, magnetizing windings surrounding said pole-pieces adapted to produce an equal number of positive and negative pole-pieces, an induced winding surrounding each pole-piece, a plurality of teeth on the inner face of each pole-piece, the pitch of said teeth being substantially twice the width of a tooth, a rotatable member arranged adjacent the inner faces of said pole-pieces, a plurality of teeth on the outer surface of said rotatable member of the same size and pitch as the teeth on the pole-pieces, said two sets of teeth being arranged so that when the teeth on the rotating element coincide with the teeth on a negative pole-piece and a positive pole-piece, the teeth on the rotating element are staggered with relation to the teeth on another negative pole-piece and another positive pole-piece, the induced winding on the first negative pole-piece being wound in the opposite direction to the induced winding on the second negative pole-piece, and the induced winding on the first positive pole-piece being wound in the opposite direction to the induced winding on the second positive pole-piece.

In testimony whereof I have hereunto set my hand in the presence of two subscribing witnesses.

ALFONS H. NEULAND.

Witnesses:
CHARLES EDELMAN,
C. C. COOK.